United States Patent [19]

Kim

[11] Patent Number: 5,064,597

[45] Date of Patent: Nov. 12, 1991

[54] METHOD OF COMPRESSION MOLDING ON HOT SURFACES

[75] Inventor: Bang M. Kim, Schenectady, N.Y.

[73] Assignee: General Electric Company, Schenectady, N.Y.

[21] Appl. No.: 435,639

[22] Filed: Nov. 13, 1989

Related U.S. Application Data

[63] Continuation of Ser. No. 175,078, Mar. 30, 1988, abandoned.

[51] Int. Cl.⁵ .................... B29C 33/04; B29C 43/02
[52] U.S. Cl. .................... 264/219; 249/135; 264/322; 264/324; 264/325; 264/DIG. 46; 264/DIG. 65; 425/407; 425/DIG. 13
[58] Field of Search ............ 264/219, 26, 294, 320, 264/322, 324, DIG. 46, 325, DIG. 65; 425/407, 408, DIG. 13, 411; 249/111, 112, 135; 62/3.2, 3.3

[56] References Cited

U.S. PATENT DOCUMENTS

| | | | |
|---|---|---|---|
| 3,185,432 | 5/1965 | Hager, Jr. | 249/116 |
| 3,804,362 | 4/1974 | Stromblad et al. | 425/DIG. 13 |
| 3,933,335 | 1/1976 | Maruyama et al. | 249/114.1 |
| 3,983,293 | 9/1976 | Ohuchi et al. | 249/114.1 |
| 4,063,705 | 12/1977 | Vodra | 249/116 |
| 4,120,924 | 10/1978 | Rainville | 425/522 |
| 4,120,930 | 10/1978 | Lemelson | 249/114.1 |
| 4,201,742 | 5/1980 | Hendry | 425/812 |
| 4,225,109 | 9/1980 | Yotsutsuji et al. | 249/135 |
| 4,225,109 | 9/1980 | Yotsutsuji et al. | 249/111 |
| 4,703,912 | 11/1987 | Aoki | 249/119 |
| 4,744,849 | 5/1988 | Michaud-Soret | 249/111 |
| 4,752,204 | 6/1988 | Kataoka | 264/294 |
| 4,925,615 | 5/1990 | Willis | 264/322 |

FOREIGN PATENT DOCUMENTS

| | | | |
|---|---|---|---|
| 2838167 | 3/1980 | Fed. Rep. of Germany | 249/116 |
| 2319477 | 2/1977 | France | 249/135 |
| 53-86754 | 7/1978 | Japan. | |
| 53-86754 | 7/1978 | Japan | 249/111 |
| 57-20328 | 2/1982 | Japan | 425/526 |
| 57-20328 | 2/1982 | Japan | 425/526 |
| 62-128711 | 6/1987 | Japan | 249/134 |
| 62-198420 | 9/1987 | Japan | 249/135 |

*Primary Examiner*—Jeffery Thurlow
*Assistant Examiner*—Mathieu Vargot
*Attorney, Agent, or Firm*—Patrick R. Scanlon; James C. Davis, Jr.; Paul R. Webb, II

[57] ABSTRACT

A mold structure including layers with different physical properties is used to provide hot surface during molding. The use of a thin layer of low thermal conductivity covered by a smooth skin layer prevents quick cooling of the surface of the pre-heated plastic to be molded. The plastic surface remains molten and flows to fill the mold during press closing, resulting in smooth surfaces even when fiber reinforced plastics are used.

1 Claim, 11 Drawing Sheets

METHOD OF COMPRESSION MOLDING ON HOT SURFACES

This application is a continuation of application Ser. No. 175,078, filed Mar. 30, 1988, now abandoned.

CROSS REFERENCE TO RELATED APPLICATIONS

This application is related to copending application entitled "Compression Molding of Composite Parts on Hot Mold Surfaces with a Short Cycle Time", Ser. No. (176,114), and "Compression Molding Using Insulating Films", Ser. No. (176,116), both assigned to the same assignee as the present invention.

BACKGROUND OF THE INVENTION

The present invention relates to mold structures for compression molding thermoplastics.

Compression molding of glass reinforced thermoplastic sheets is a promising method for producing relatively thin, wide and strong parts such as car hoods, doors and panels. One important prerequisite for the use of glass reinforced composite products in automobile applications is a Class A surface. While there is no universally accepted specification, the Class A surface is a glossy, smooth and polished surface which should be as smooth as that of current automobile exterior parts made from sheet metal.

Current molding processes of glass reinforced thermoplastic composite sheets begins with heating the composite blanks in an oven, typically in infrared or hot air convection ovens. The material is heated above its melting point or if an amorphous material at least substantially above its glass transition temperature. The hot blanks are then pressed between cool mold surfaces (surfaces lower than the melting point or the glass transition temperatures), which are typically 175°–250° F. A molding pressure of one half ton/sq. in. to two tons/sq. in. is applied to the mold during a typical cycle time of 45–60 seconds.

When the composite blanks are heated, they expand (loft) due to the recoil forces within the fibers. The surface of the expanded blanks then cools during its transfer to the mold, resulting in "frozen" resins on the surface. Compression of this blank in the cool mold produces surfaces which are not completely filled with resins, although some hot molten material moves from the inner core to the surface. This creates unfilled areas in the form of exposed fibers and surface porosity or voids. Since the resin at the cold surface is frozen and does not flow, rough boundaries between charged and newly formed areas are also produced. These exposed fibers, porous areas and blank boundaries are the major manifestations of surface roughness, although other physical processes, such as differential thermal shrinkage between fibers and resins, can also result in surface roughness and/or waviness.

Recently it has been found that smooth surfaces can be obtained from neat resin in blow molding by using hot surface molding. The resin is supplied hot to the mold as a parison in blow molding. These techniques, which are based on temperature cycling of mold surfaces using heating and cooling fluids, increase the cycle time of the process and require very complex control schemes which are the major disadvantage of these techniques. These techniques have been demonstrated only for blow molding neat resins. Compression molding of composite sheets is much different from blow molding of neat resins. Heating of composite sheets causes the fibers to loft producing exposed fibers at the surfaces. Attempts to obtain smooth surfaces with composite sheets have involved trying to change the structure of the composite sheets so that the outside layers on the composite sheets have neat resin with barrier layers sometimes being provided to prevent the fibers situated in the middle layers from coming to the surface. These sheets could then be molded using conventional compression molding techniques.

It is an object of the present invention to provide a multilayer composite mold which can be used in current molding systems without major modifications, and can compression mold reinforced thermoplastic composite sheets into finished products that have smooth surfaces, a minimum of exposed fiber, porosity, and blank boundaries.

It is a further object of the present invention to provide a multilayer composite mold which reduces the required molding pressure and therefore reduces press size, which is particularly significant in large part fabrication.

It is a still further object of the present invention to provide a multilayer composite mold which results in short cycle times and therefore increased throughput for each molding operation.

SUMMARY OF THE INVENTION

In one aspect of the present invention a multilayer mold for compression molding preheated thermoplastic into finished parts is provided. The multilayer mold comprises a core having a surface with the general contour of the part to be molded and cooling means. A thermal insulating layer is bonded to the contoured surface of the mold for slowing initial cooling of the preheated thermoplastic during molding. A skin layer having the contour and surface characteristics of the desired finished part is bonded to the insulating layer.

BRIEF DESCRIPTION OF THE DRAWING

The subject matter which is regarded as the invention is particularly pointed out and distinctly claimed in the concluding portion of the specification. The invention however, both as to organization and method of practice, together with further objects and advantages thereof, may be best understood by reference to the following description taken in conjunction with the accompanying drawing figures in which:

DETAILED DESCRIPTION OF THE INVENTION

Figure 1:
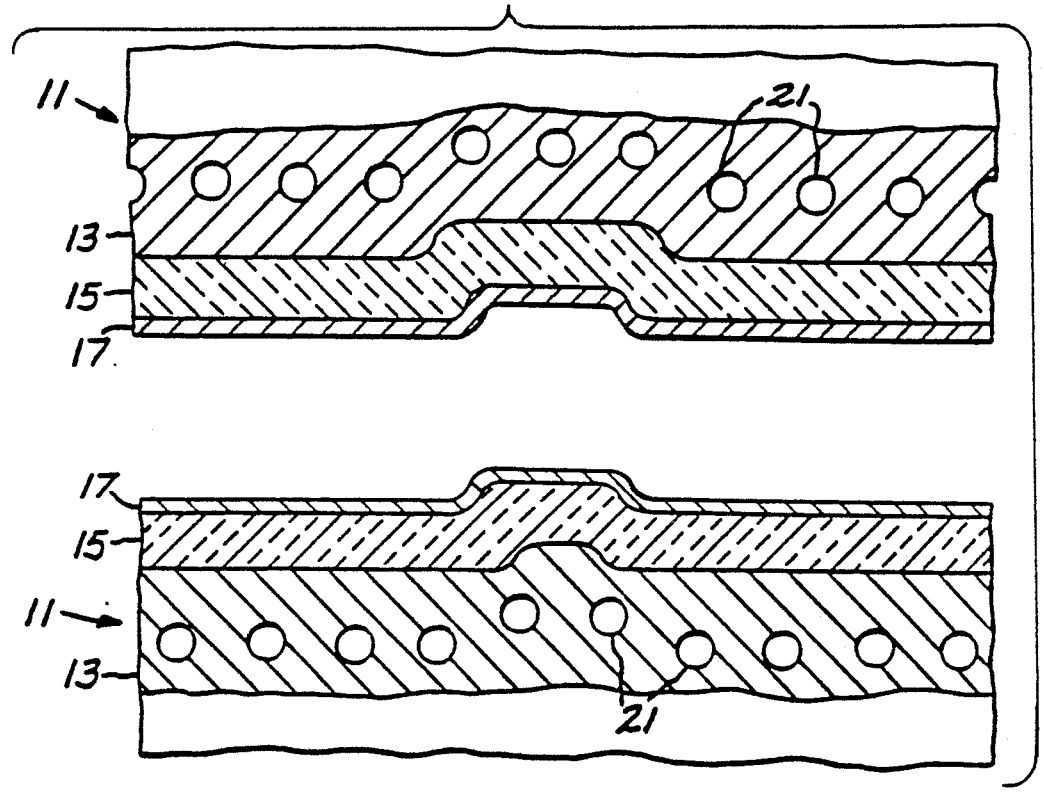
FIG. 1 is a partial side elevation, partly in section, of multilayer upper and lower mold halves in accordance with the present invention.
Figure 2:
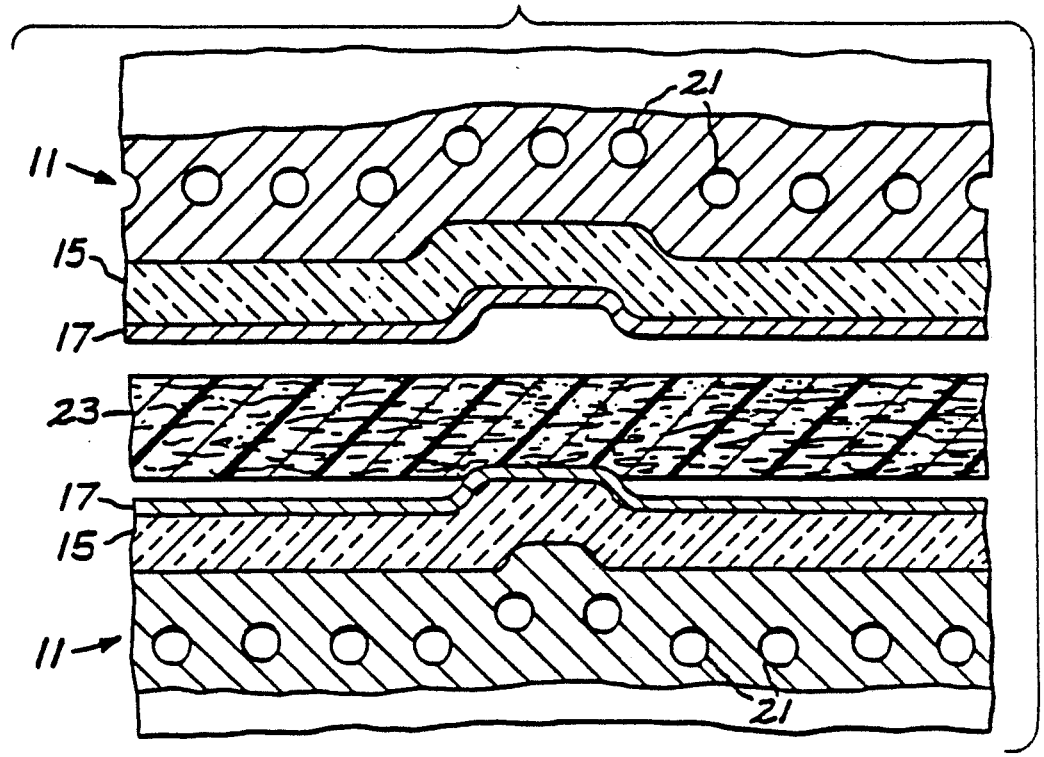
FIG. 2 shows the mold halves of FIG. 1 with a sectional view of a thermoplastic composite sheet situated between the mold halves.

Referring now to the drawing wherein like numerals indicate like elements throughout and particularly FIGS. 1 and 2 thereof, a partial side elevation of a multilayer mold is shown. Each of the mold halves 11 comprises a core of high thermal conductivity material 13, the mating mold surfaces are covered by a thin thermal insulating layer 15. The thermal insulating layer can be fabricated from low thermal conductivity material such as plastics, plastic composites, porous metals, ceramics and low conductivity metal alloys. Other low thermal conductivity materials, which are used for insulation could also be used. In situations where the insulating material is not mechanically strong and cannot easily produce surfaces of high quality when used as a mold surface, a hard skin layer 17 covers the insulating layer. The hard skin layer comprises a thin layer of smooth hard metal, ceramic or other hard solid, which provides the necessary mechanical strength while imparting a smooth surface to the object molded. The hard skin layer 17 and insulating layer 15 can be applied, for example, by lamination, deposition or sintering. The high conductivity core material 13 provides good heat transfer to and from the insulating layer. The core material is cooled by means of passages 21 which can carry cooling liquids. The core material can comprise tool steel, but softer less expensive metals such as aluminum can alternatively be used. The core portion of the mold halves do not come into contact with the composite material 23 being molded, therefore they are not subject to wear by the material being molded.

One method of fabricating the multilayer mold comprises making a replica of the part to be molded out of graphite or metal. The two metal core halves are machined to the contour of the replica part. A hard skin layer is produced by chemical vapor deposition or plasma deposition of 10-100 mils of metal on the graphite part. The mold halves are positioned on either side of the graphite part, spaced away to leave a space for the insulating layer. The region between the graphic part and the metal mold holes are then used as mold cavities for high temperature plastic composite, or forming and sintering of a porous metal or ceramic. The graphite replica is then removed and two multilayer mold halves remain. Another method is to produce asymmetric ceramic composites, having high density material at the surface and porous materials for the rest of the insulating layer.

Molding on hot surfaces significantly reduces surface imperfections on compression molded parts of composite materials having fiber contents of 30 to 40%. The insulating layer allows molten plastic contacting the insulating layer either directly or through the thin metal skin to remain hot and cool slowly. This results in a hot plastic surface for a short period of time. If the molten plastic is compressed, the resin fills the mold surfaces completely, resulting in a smooth surface finish.

To provide a high resin surface temperature after contact with the cold mold surface, preheating of the plastic to as high a temperature as possible is required. If sufficient heat can be supplied to the plastic, it is not necessary to heat the mold surface. Therefore, a smooth surface can be produced by using an insulating layer without any additional heating of the mold surface. However, slight preheating of the mold surface layer may be required to process a plastic having a high glass transition temperature or a high melting point or to provide more flow of the resin at the same pressure. Preheating of the mold surface can be accomplished by infrared, electric current, solid conduction, induction, radio frequency, microwave or thermal fluid heating, for example. The thickness of both the hard solid skin layer and the low thermal conductivity layer are determined by cycle time, mechanical strength and preheat temperature of the plastic. The preferred structure of the multilayer mold is with the skin layer and low thermal conductivity layer permanently attached to the core. However, each layer can be made detachable from the core or from one another.

Figure 3:
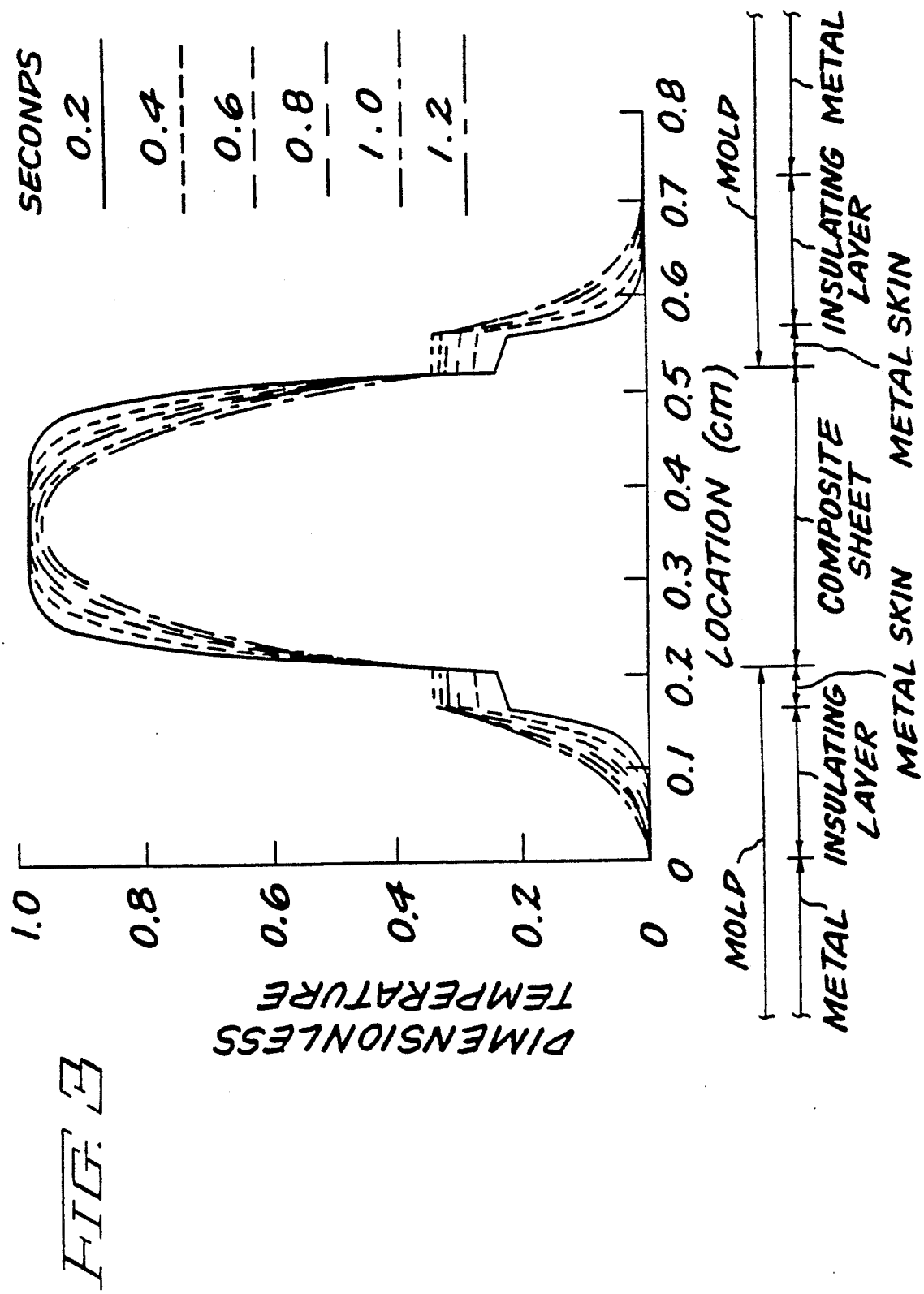
FIG. 3 is a graph showing the calculation of transient heat transfer through the multilayer structure of the molding system beginning with mold closing.
Figure 4:
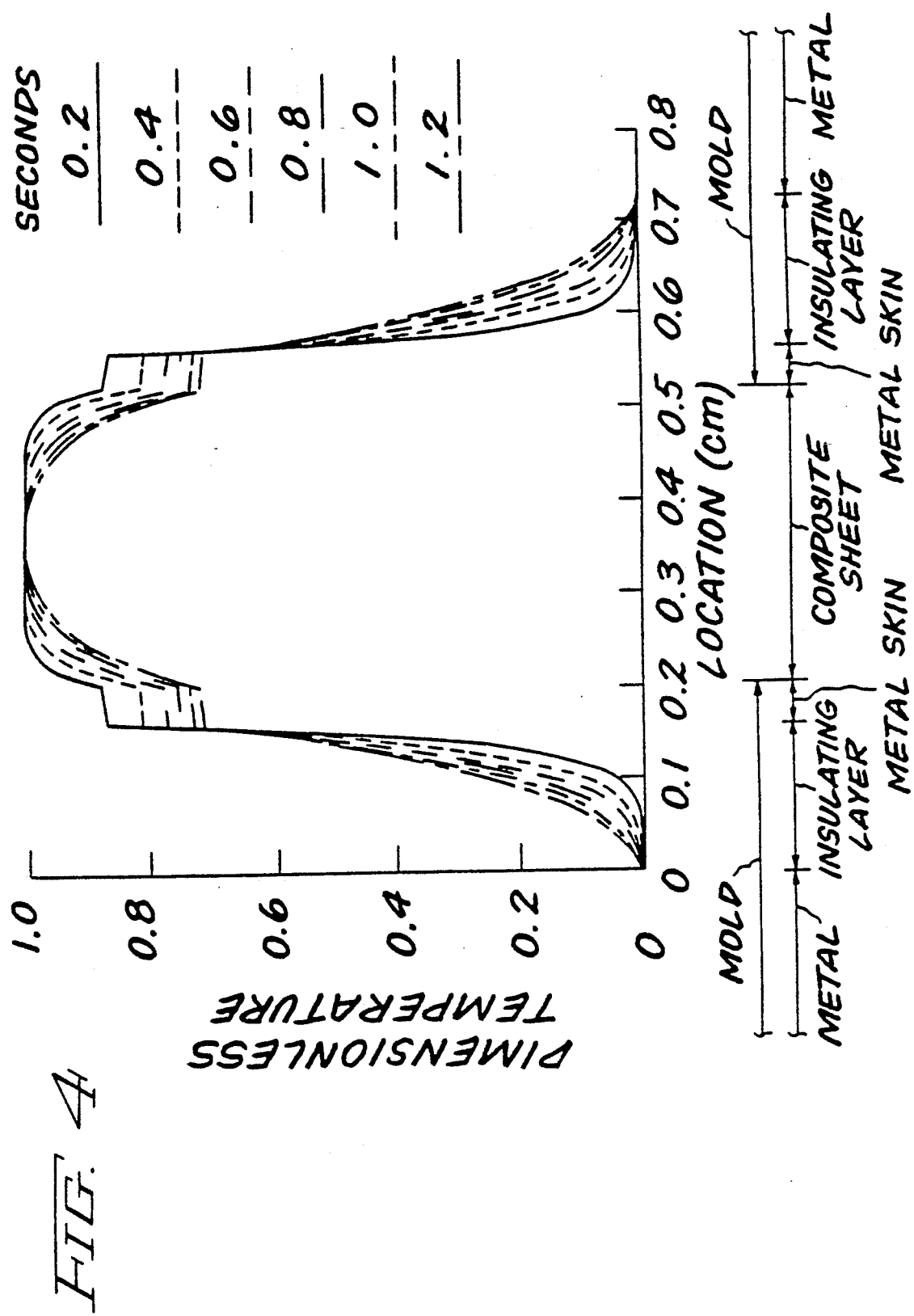
FIG. 4 is a graph showing the calculation of transient heat transfer for the multilayer system of FIG. 3, beginning with mold closing when the metal skin layer of the mold is preheated.

Transient heat transfer calculation of multilayer systems simulating compression molding of composite sheets on insulated mold surfaces without preheating of the skin layer is shown in FIG. 3. The multilayer structure analyzed comprises seven layers: a metal core, a sixteenth of an inch insulating layer, a sixty-fourth of an inch metal skin layer, an eighth inch composite, a sixty-fourth of an inch metal skin layer, a sixteenth of an inch insulating layer and a metal core. The graph uses dimensionless temperature as the ordinate axis. Dimensionless temperature is defined as the ratio $(T-T_c)/(T_i-T_c)$, where $T$, $T_i$ and $T_c$ stand for temperature as a function of time and location, initial temperature, and boundary condition temperature, respectively. For example, a constant temperature of 225° F. provided at one quarter inch from the mold surface such as by the use of a cooling fluid flowing in the core. It is shown that the temperature of the skin layer initially increases due to the heat from the preheated composite sheet. Surface cooling occurs slowly and the temperature of the plastic resin at the surface allows the resin to flow and fill voids, exposed fibers, and porous areas. Preheating the skin layer to 550° F. as shown in the graph of FIG. 4 will increase the surface temperature of the composite after initial contact with the mold surface.

Figure 5:
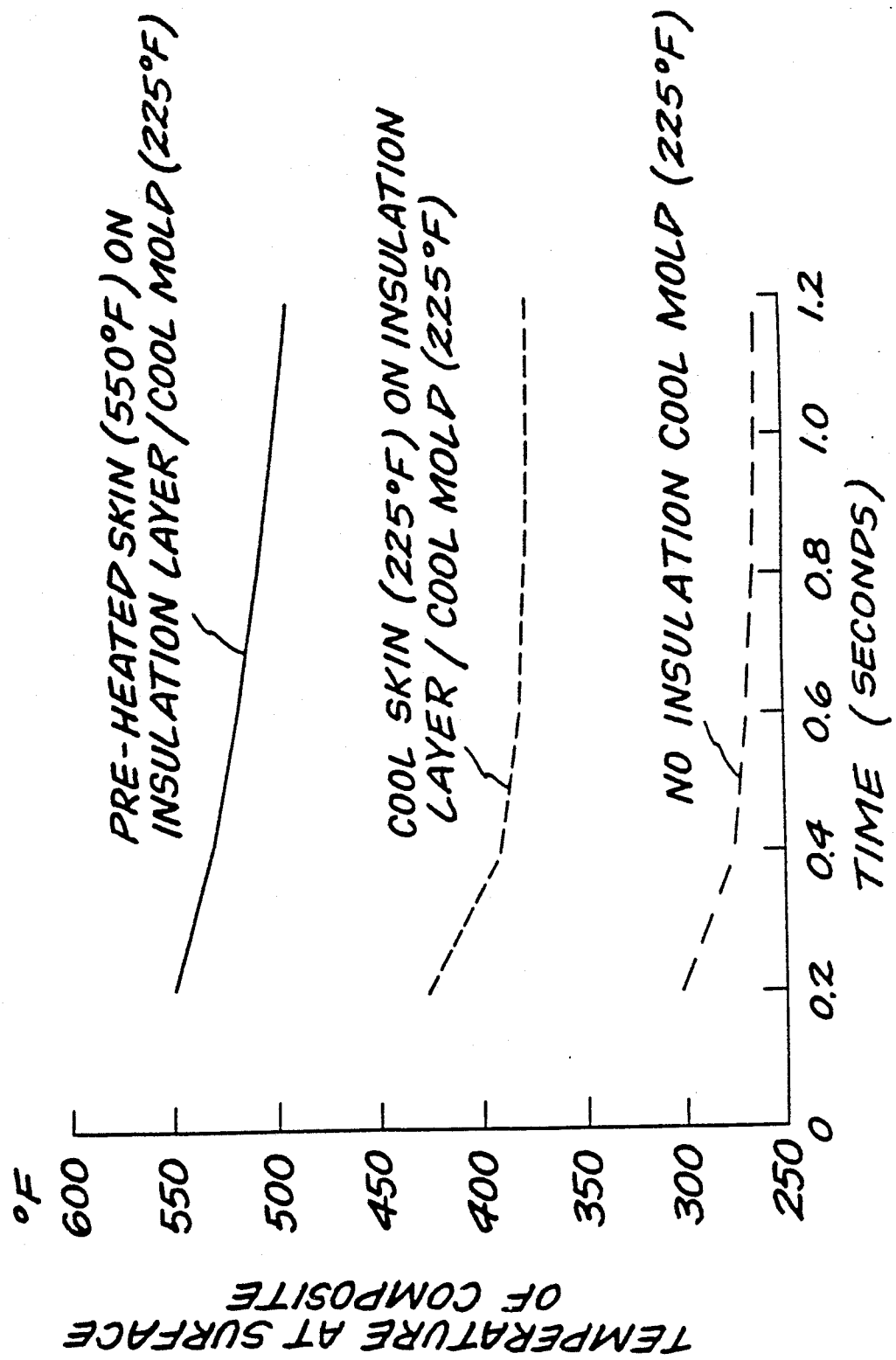
FIG. 5 is a graph showing the temperature at the surface of a composite shortly after the mold closing for three different molds, a pre-heated skin on an insulation layer, a cool skin on an insulation layer and a cool mold without an insulation layer, with the mold cooled to 225° F.

FIG. 5 shows the temperature at the surface of the composite just after molding for three different situations, a mold without an insulation layer, a mold with an insulation layer and an unheated metal skin, and a mold with an insulation layer and a preheated skin. The dimensions of the mold insulating layer, skin layer and composite layer are the same as FIGS. 3 and 4. The molds in each of these cases are cooled to 225° F. and the composite material is heated to 550° F. The preheated skin was also heated to 550° F. While immediate cooling at the surface occurs in the case without an insulator, a higher temperature was maintained with an insulator and an unheated metal skin. It indicates that the resin with a glass transition temperature lower than 350° F. will fill the mold surfaces, producing smooth surfaces without preheating of the skin layer. Preheating of the metal skin can increase the mold temperature to any desired initial amount.

Figure 6:
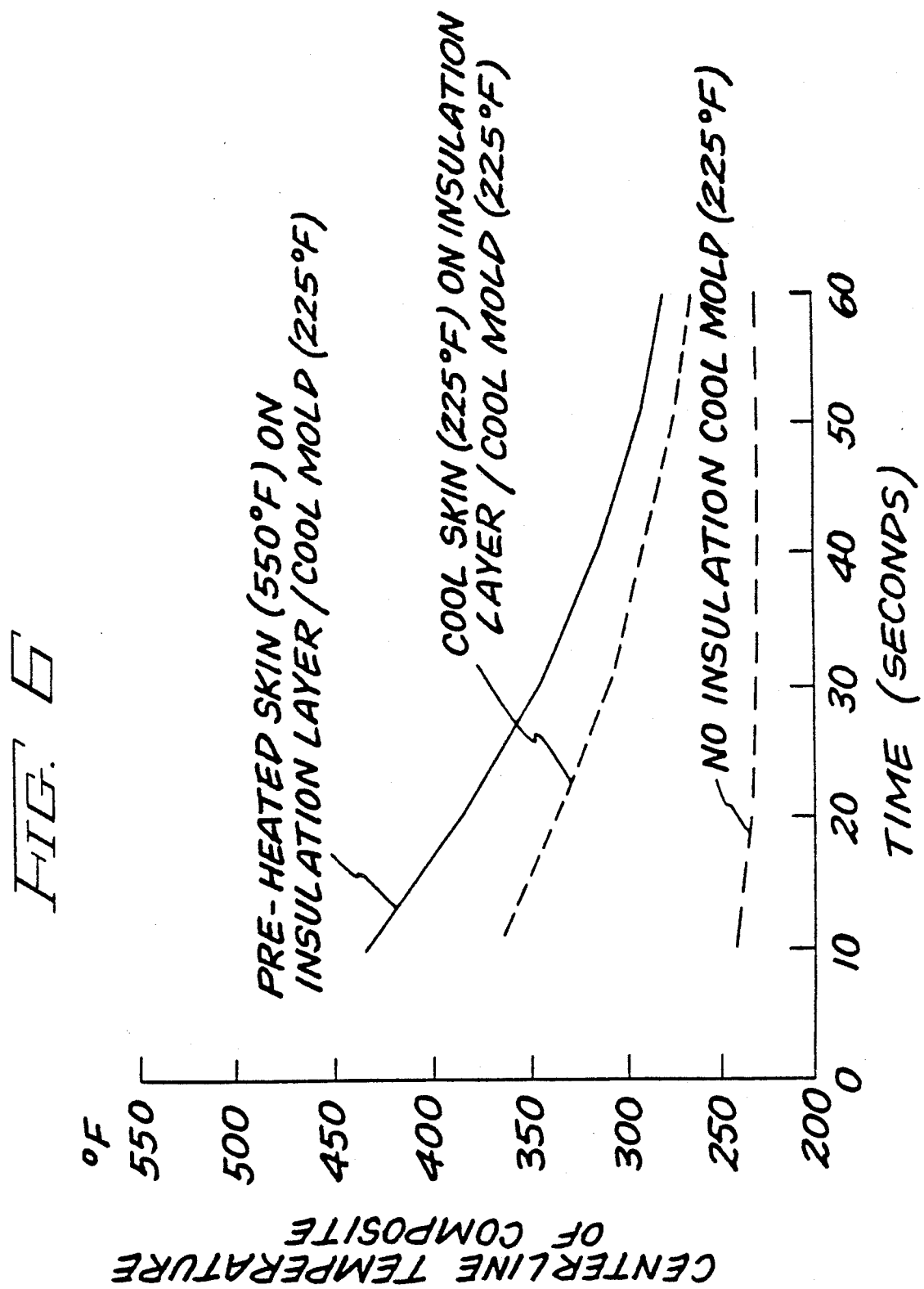
FIG. 6 is a graph showing the temperature of the centerline of the composite material in each of the three molds of FIG. 5 10 to 60 seconds after molding.

Referring now to FIG. 6, the temperature of the centerline of the composite material of FIG. 5 is shown from 10 to 60 seconds after molding. The cooling is quicker with cool skin than with preheated skin. With a preheated skin on an insulating layer in a 225° F. mold and with the mold with the cool skin on an insulating layer in a 225° mold, the interior of the composite sheet does not cool below 250° F. in less than 60 seconds. A composite sheet with a matrix material having a glass transition temperature of 250° F. would not be sufficiently cool to allow removal from the mold.

Figure 7:
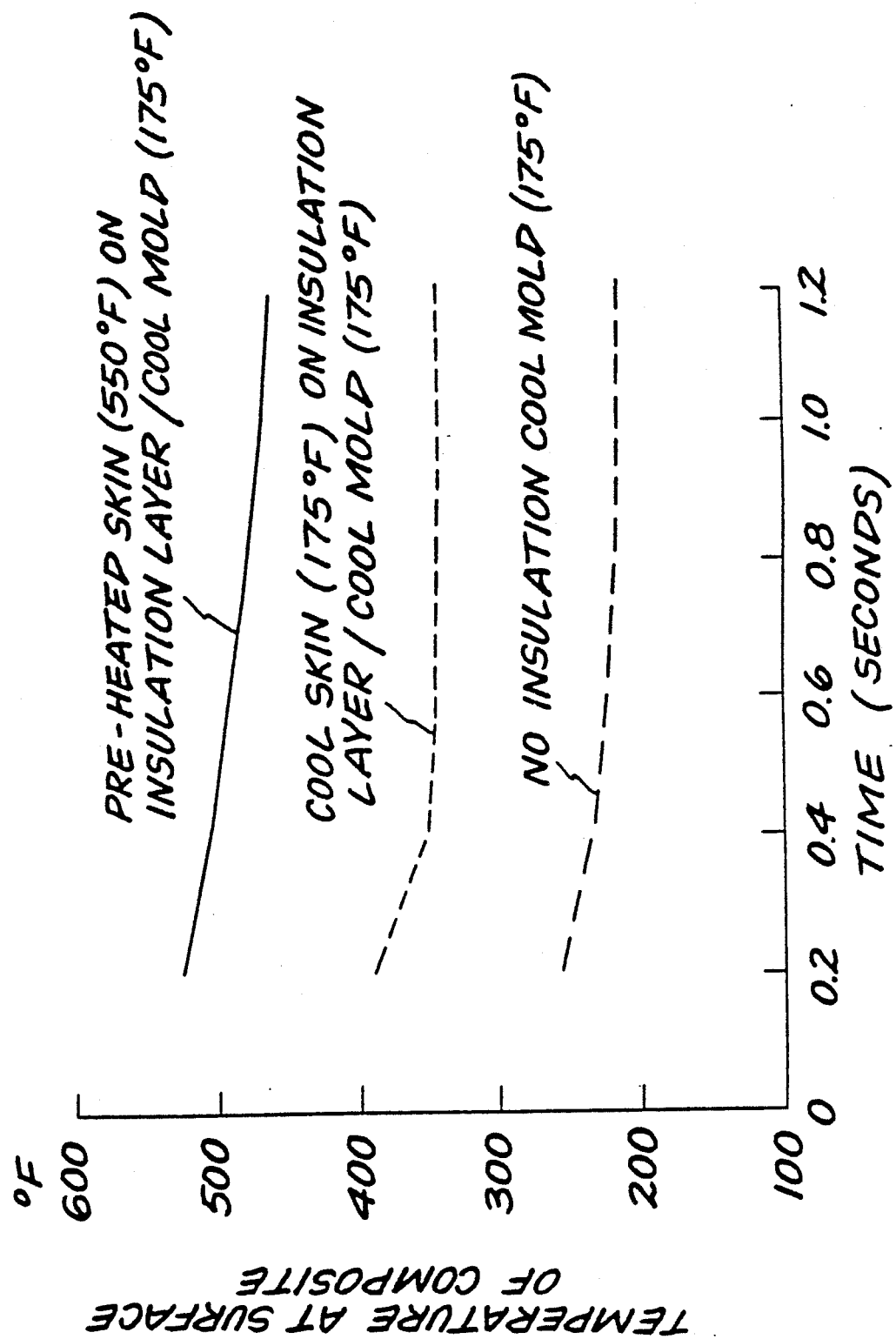
FIG. 7 is a graph showing the temperature at the surface at a composite in the three molds of FIG. 5 when the mold is cooled to 175° F.
Figure 8:
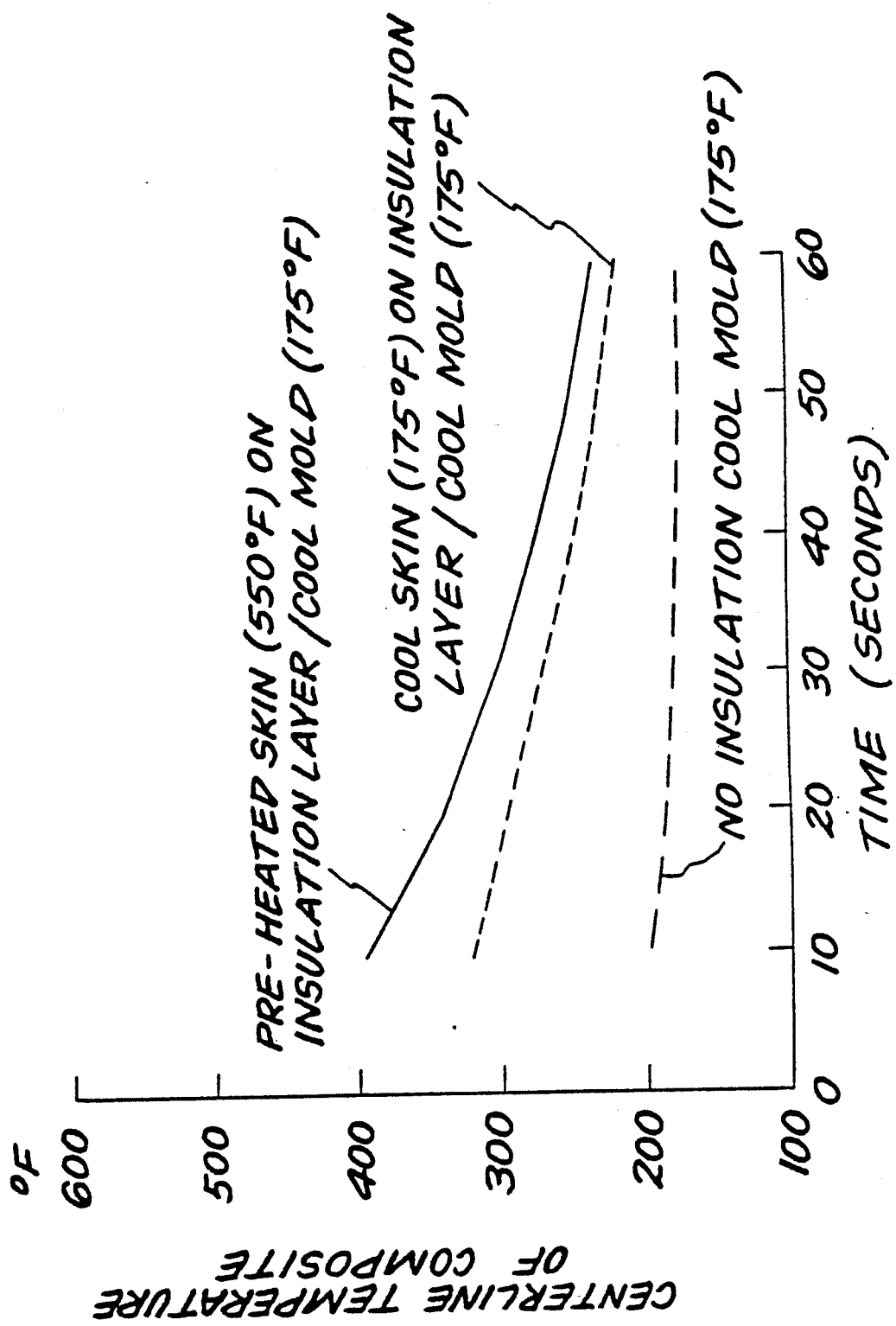
FIG. 8 is a graph showing the centerline temperature of the composite material 10 to 60 seconds after mold closing for the three molds of FIG. 5 when the mold temperature is maintained at 175° F.

Referring to FIGS. 7 and 8, when the molds in the graphs of FIGS. 5 and 6 are cooled to 175° F., one quarter of an inch from the insulating layer and the composition again heated to 550° F., the mold surface is maintained higher than 350° F. for initial 1.2 seconds when insulators are used and the time required for the centerline of the composite to cool below the glass transition temperature of 250° F., is less than a minute for the preheated and cold skin layer on an insulating layer molds.

Figure 9:
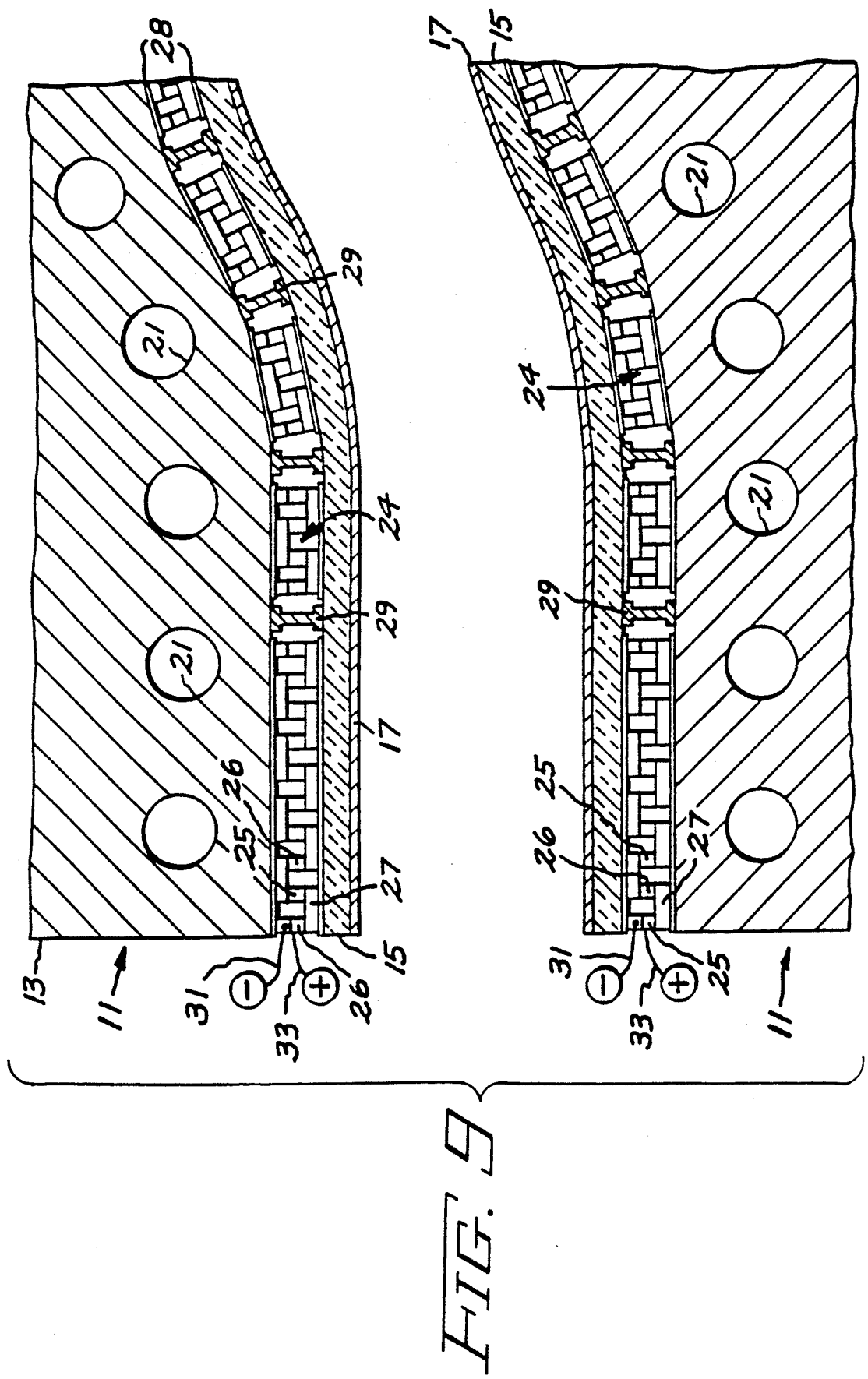
FIG. 9 is a partial side elevation in section of multilayer upper and lower mold halves in accordance with another embodiment of the present invention.
Figure 10:
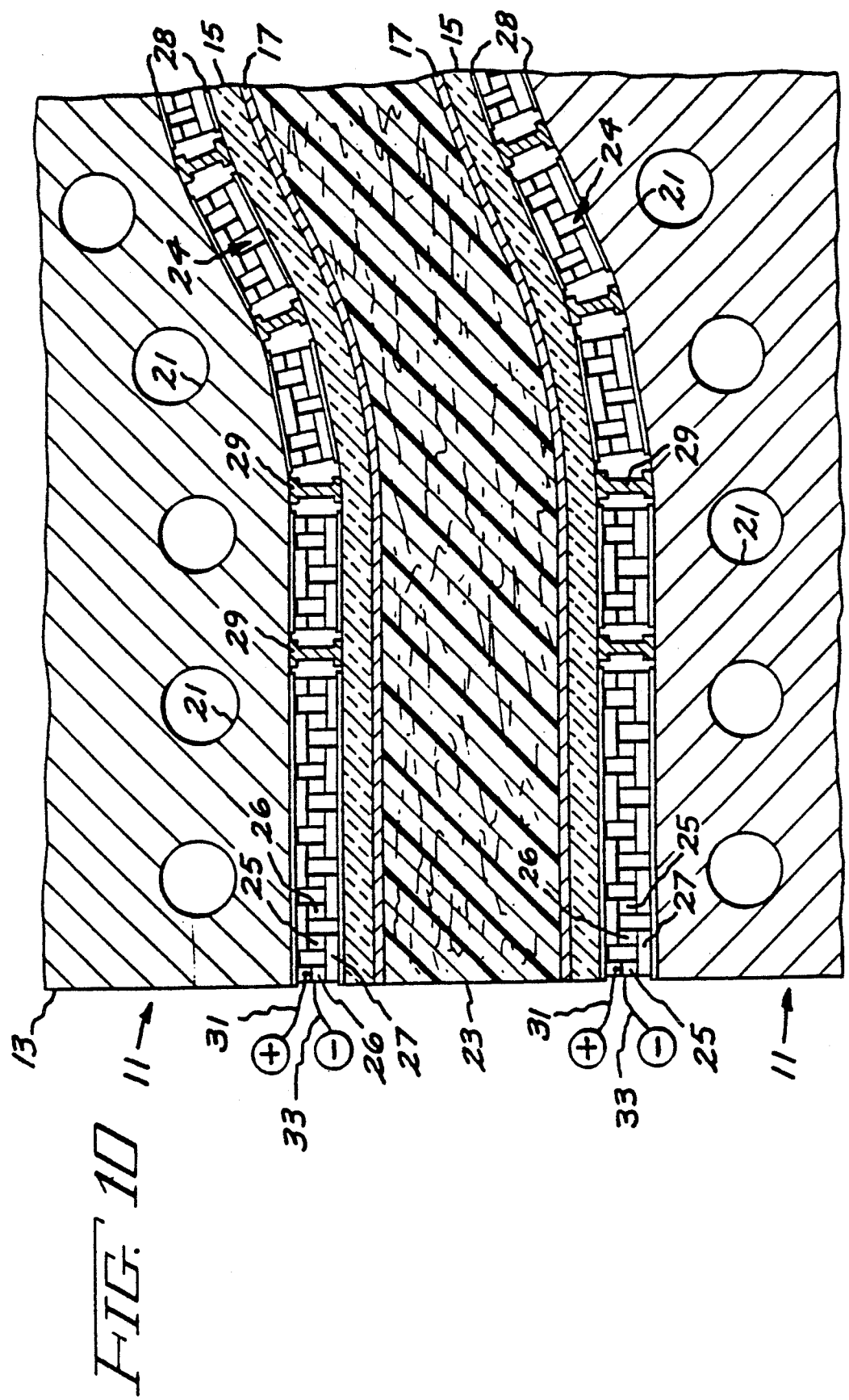
FIG. 10 shows the mold halves of FIG. 9, with a sectional view of a thermoplastic composite sheet situated between the mold halves after mold closing.

Referring now to FIGS. 9 and 10 another embodiment of the present invention is shown. Thermoelectric solid state heat pump modules 24 which operate by means of the peltier effect to reversibly generate heat at the junction between two different conductors when a current passes through the junction, are shown as an additional layer in the mold of the type described in FIG. 1. The thermoelectric modules comprise thermoelectric couples made from P type 25 and N type semiconductor 26 which are connected together by electrical conductors 27 in series and arranged between a ceramic plate insulator 28 so that the couples are in parallel thermally. The exterior faces of the ceramic plate insulators are typically metallized and tinned. The thermoelectric modules are situated between the core 13 and the insulating layer 15. Reinforcing ribs 29 are shown between the modules to improve the compression strength of the mold and protect the modules from excessive compressive forces. The modules are electrically connected to a power source with leads 31 and 33 shown exiting each half of the mold. Individual modules allow the thermoelectric device layer to generally follow the contour of the mold. Thermoelectric modules are available from Melcor Materials Electronic Products Corporation, Trenton, N.J., for example.

In operation, before the composite material is placed in the mold shown in FIG. 9, the polarity of the direct current supplied to the mold causes the modules 24 to achieve a temperature gradient across the modules with the cold junction situated adjacent the insulating layer 15 and the warm junction adjacent the hard skin layer 17. The insulation layer protects the thermoelectric devices from heat given off from the hot composite sheet when it is placed in the mold. The hot composite sheet temperature typically exceeds the maximum operating temperature of the connected thermoelectric module which is approximately 260° F.

Referring now to FIG. 10, a short time after mold closing, when the molten plastic has ceased flowing, typically one second, the current through the thermoelectric devices is reversed, to reverse the temperature gradient across the module to help in cooling the composite sheet and achieving a calculated cooling time of less than one minute for a $\frac{1}{8}$ inch composite sheet.

Figure 11:
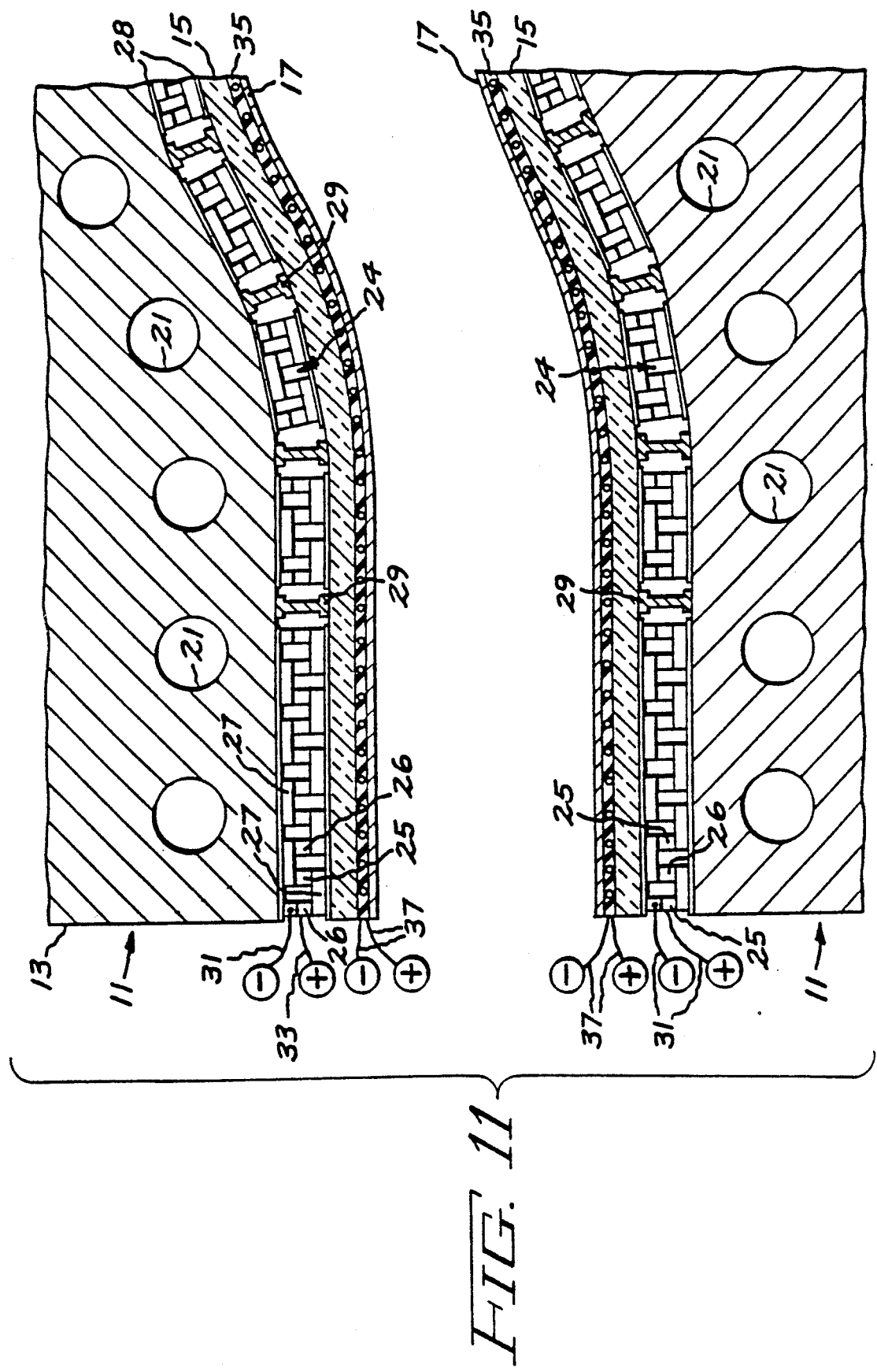
FIG. 11 is a partial side elevation, in section of multilayer upper and lower mold halves in accordance with another embodiment of the present invention.
Figure 12:
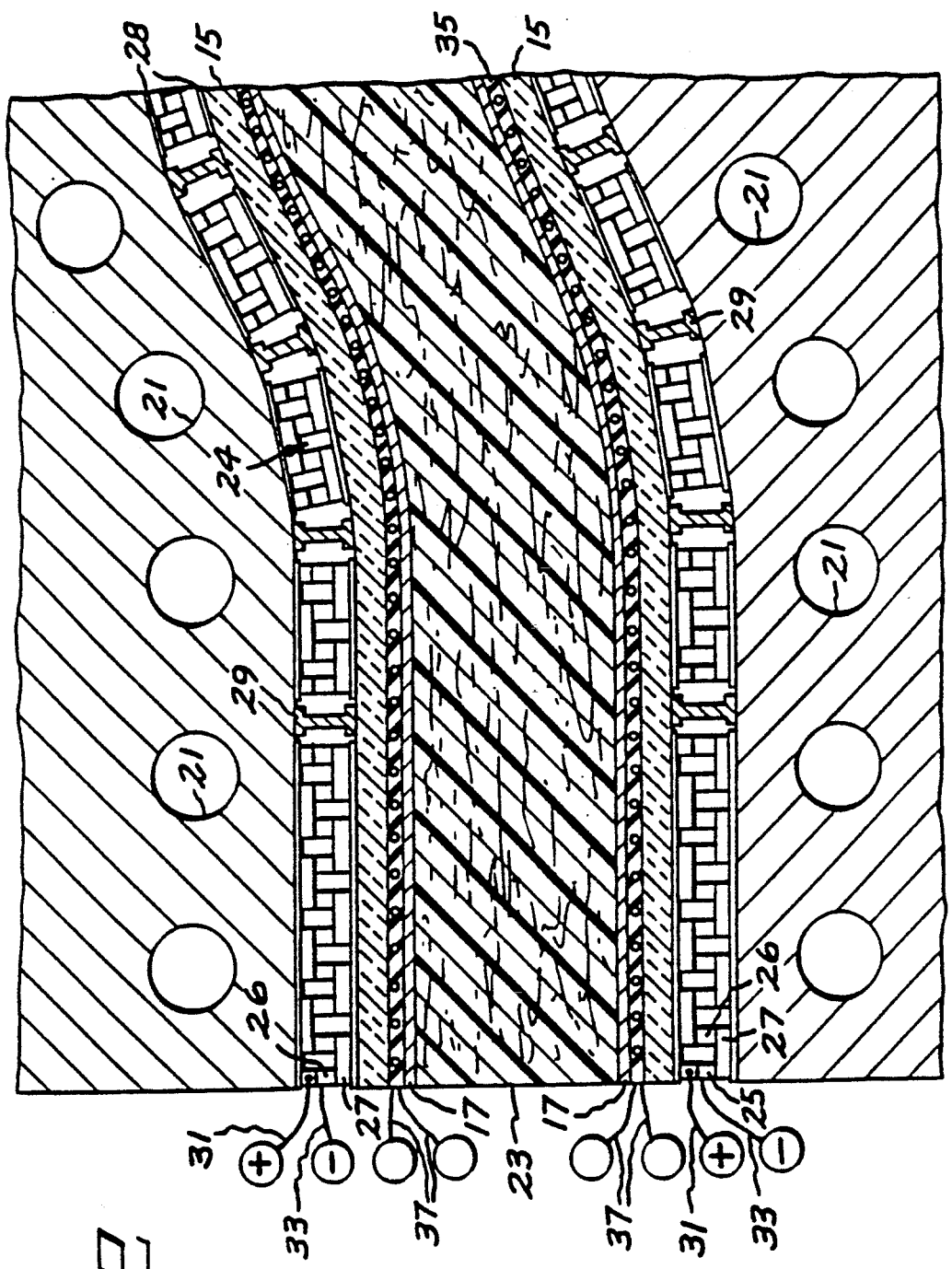
FIG. 12 shows the mold halves of FIG. 11, with a sectional view of a thermoplastic composite sheet after mold closing.

FIG. 11 shows another embodiment of the present invention. A mold of the type shown in FIG. 9 has an additional layer comprising Joule or resistance heating material 35 situated between the insulating layer 15 and the outer skin layer 17 to achieve a preheated skin at elevated temperatures. Leads 37 extend from the resistance heating material. The thermoelectric devices 24 and resistance heating 35 can both operate during the preheat stage and continue for a short time after the preheated composite is placed between the mold halves and the mold closes. Shortly after the mold closes, as shown in FIG. 11, the power to the resistance heater is turned off, and the polarity of the current supplied to the thermoelectric device is reversed. The thermoelectric devices then aid in cooling the composite part. Preheating allows for the composite flow at reduced pressure or greater composite flow at the same pressure. The insulating layer 15 protects the thermoelectric devices during preheating by retarding heat transfer across the insulating layer. The flow of the cooling water may be continued for the entire cycle.

If desired in the embodiments of FIGS. 8, 9 and 10 and 11, the flow of cooling fluid through the mold can be discontinued before the composite is placed in the press and started again after mold closing.

The skin layer in the different embodiments should have a thermal conductivity in the range of $1 \times 10^{-2}$ to $1 \times 10^{-1}$ cal/cm$^2$ sec. C/cm and a thickness of 0.025–0.25 cm. (10 mil to 100 mil). The symbol C represents temperature in centigrade. The insulating layer should have a thermal conductivity of $5 \times 10^{-3}$ to $1 \times 10^{-4}$ cal/cm.$^2$ sec. C/cm. The thickness depends on the thermal diffusivity $\alpha$ of the material which has units of cm$^2$/sec. Thermal diffusivity is defined by the following equation:

$$\alpha = \frac{k}{c\rho} \qquad (1)$$

where k is the thermal conductivity, c the density and $\rho$ the specific heat, all expressed in CGS units. The thickness of the material in centimeters has a range represented by equation 2.

$$\sqrt{\alpha} < \text{thickness} < \sqrt{\alpha} \qquad (2)$$

With the lower end of the range the minimum thickness required to maintain the heat in the composite sheet during the first one second of cooling. Greater thicknesses maintain the temperature longer but require longer cooling times. The upper end of the thickness range represents an addition of no more than two minutes to the entire cooling cycle.

The core of the multilayer mold has a thickness of 0.5 cm.–5 cm. (0.2 in.–2 in.) between the insulating layer and the cooling fluids and a range of conductivities the same as the skin layer $1 \times 10^{-2} - 1 \times 10^{-1}$ cal./in.$^2$ sec. C/cm.

The foregoing has described a multilayer composite mold for compression molding thermoplastic which can be used in current molding systems without major modification and can compression mold reinforced thermoplastic composite sheets into finished products that have smooth surfaces, a minimum of exposed fiber, porosity, and blank boundaries. The multilayer composite mold of the present invention reduces the required molding pressure and reduces cycle time.

While the invention has been particularly shown and described with reference to several preferred embodiments thereof, it will be understood by those skilled in the art that various changes in form nd detail may be made without departing from the spirit and scope of the invention.

What I claim is:

1. A method of compression molding glass reinforced thermoplastic resin sheets into finished parts with smooth surfaces in short cycle times, comprising the steps of:

forming a multilayered mold having a metal core with the general contour of the part to be molded, said core including cooling passageways, said multilayered mold having a plurality of thermoelectric modules fixedly secured to said metal core an insulating layer fixedly secured to the thermoelectric modules, electrical heating means fixedly secured to the insulating layer, and a metal skin layer fixedly secured to said electrical heating means;

continuously cooling said core using a cooling liquid in said passageways;

providing power to the electrical heating means to heat the metal skin layer;

providing current in a first direction to the thermoelectric devices causing the thermoelectric devices to heat the insulating layer;

placing a preheated glass reinforced thermoplastic resin sheet in the mold;

closing the mold and compressing the sheet;

discontinuing power to the electrical heating means after mold closing;

providing current in a second direction opposite to the first to the thermoelectric devices causing them to cool the insulating layer; and opening the mold when the center of the thermoplastic part is sufficiently cooled.

* * * * *